United States Patent
Marshall

(10) Patent No.: US 9,779,256 B2
(45) Date of Patent: Oct. 3, 2017

(54) IAMNOTANUMBER© CARD SYSTEM: AN IMAGE-BASED TECHNIQUE FOR THE CREATION AND DEPLOYMENT OF NUMBERLESS CARD SYSTEMS

(71) Applicant: Roger G Marshall, Plymouth, NH (US)

(72) Inventor: Roger G Marshall, Plymouth, NH (US)

( * ) Notice: Subject to any disclaimer, the term of this patent is extended or adjusted under 35 U.S.C. 154(b) by 96 days.

(21) Appl. No.: 14/998,934

(22) Filed: Mar. 7, 2016

(65) Prior Publication Data

US 2017/0255783 A1    Sep. 7, 2017

(51) Int. Cl.
| | |
|---|---|
| H04L 29/06 | (2006.01) |
| G06F 21/60 | (2013.01) |
| G06T 11/60 | (2006.01) |
| G06T 1/00 | (2006.01) |
| G06F 21/31 | (2013.01) |
| G06K 7/14 | (2006.01) |
| G06K 19/06 | (2006.01) |

(52) U.S. Cl.
CPC ............ *G06F 21/602* (2013.01); *G06F 21/31* (2013.01); *G06K 7/1417* (2013.01); *G06K 19/0614* (2013.01); *G06K 19/06037* (2013.01); *G06T 1/0007* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,195,698 B1 * | 2/2001 | Lillibridge | G06F 21/31 709/203 |
| 8,090,945 B2 * | 1/2012 | Singhal | G06F 21/32 713/168 |
| 8,281,145 B2 * | 10/2012 | Rasti | H04L 63/0421 705/64 |
| 2005/0145691 A1 * | 7/2005 | Dillard | G06Q 20/24 235/380 |
| 2007/0033149 A1 * | 2/2007 | Kanngard | G06F 21/31 705/65 |
| 2009/0217035 A1 * | 8/2009 | Abdul Hameed Khan | G06F 21/31 713/168 |
| 2010/0030696 A1 * | 2/2010 | Naccache | G06F 21/305 705/71 |
| 2011/0161232 A1 * | 6/2011 | Brown | G06F 21/32 705/71 |
| 2014/0040633 A1 * | 2/2014 | Leleu | G06F 21/36 713/189 |

* cited by examiner

*Primary Examiner* — Maung Lwin

(57) ABSTRACT

IAMNOTANUMBER© Card System is a software system which uses a specially designed encryption/decryption algorithm for the creation of credit and debit cards which are numberless but contain, instead, images based on personal information provided by the card user and information provided by the card issuing organization. These numberless cards require a password supplied by the card user in order to be used at point-of-transaction terminals. The system can also be used to produce drivers' licenses, health insurance cards, social security cards and special identification (ID) cards for organizations which may wish to keep not only their employee identities hidden but the identities of the organizations hidden as well.

19 Claims, 8 Drawing Sheets

IAMNOTANUMBER© Card system sample cards -
a) Employee ID card, b) Credit card, c) Debit card and d) Driver's license

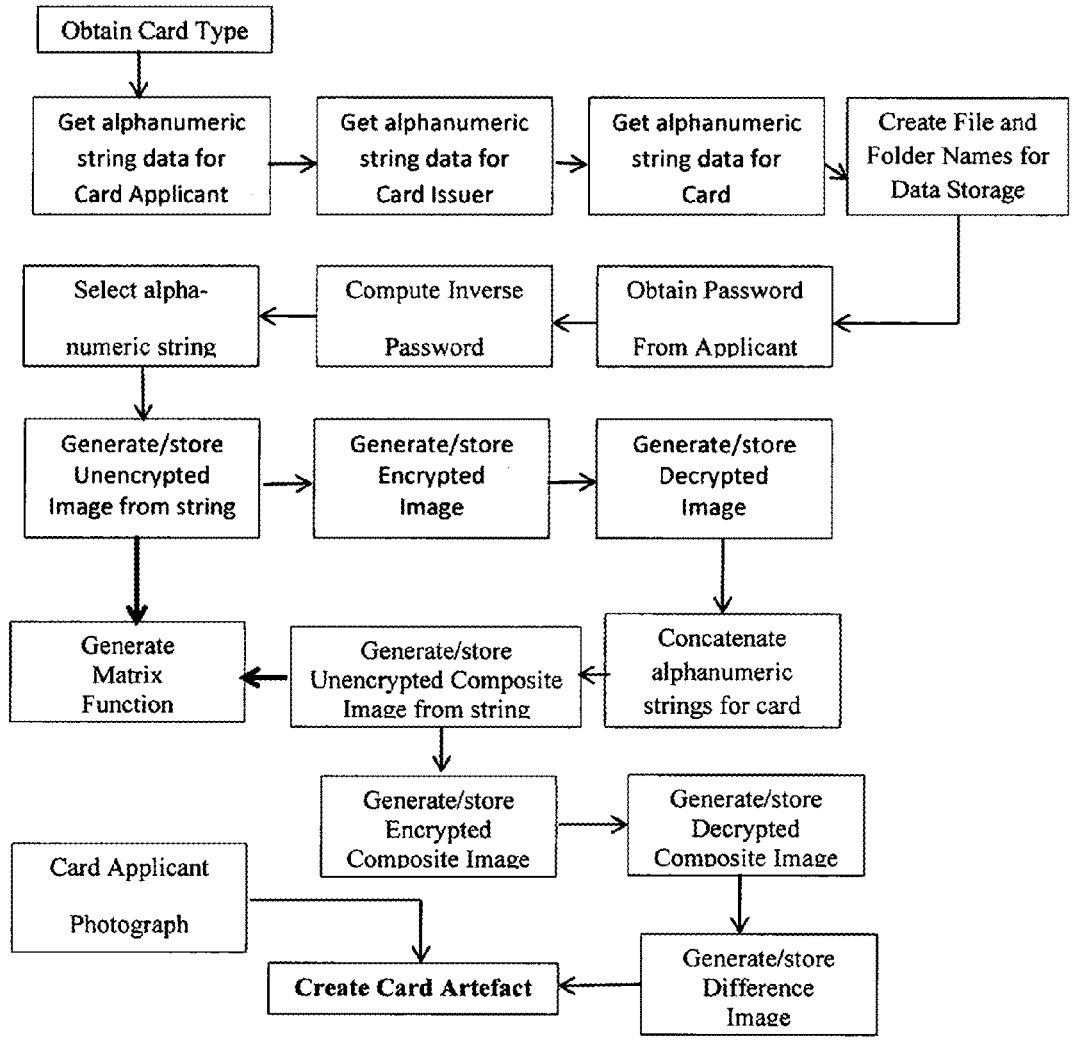
FIGURE 1 Block schematic of the IAMNOTANUMBER© Card system

| Data Type | Sample Date Value | Image Representation |
|---|---|---|
| Card Issuer | 'Any Bank USA' | |
| | 'Any Museum Inc.' | |
| | 'Any State DMV' | |
| Card Number | '1111-22222-333333' | |
| Card Security Code | '0420' | |
| Card Expiration Date | 'July 4, 2020' | |

FIGURE 2 Type A images based on the card issuer's data items.

| Data Type | Sample Date Value | Image Representation |
|---|---|---|
| Card Holder | 'Mona Lisa' | |
| Card Holder's Address | 'The Louvre, Paris, France' | |
| Date of Birth | 'August 1, 1850' | |

FIGURE 3 Type A images based on the card holder's data items.

| Data Type | Sample Date Value | Encrypted Image | Decrypted Image |
|---|---|---|---|
| Card Issuer | 'Any State DMV' | 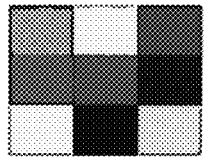 | 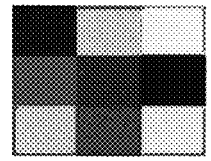 |
| | 'Any Bank USA' | 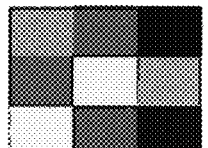 | 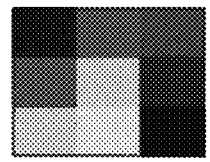 |
| | 'Any Museum Inc.' | 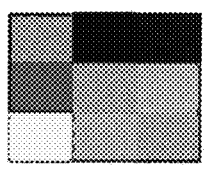 | 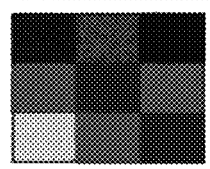 |
| Card Number | '1111-22222-333333' | 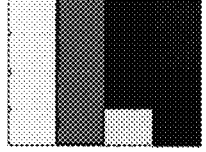 | 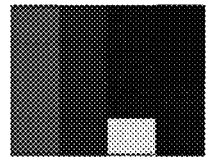 |
| Card Security Code | '0420' |  |  |
| Card Expiration Date | 'July 4, 2020' | 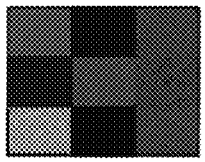 | 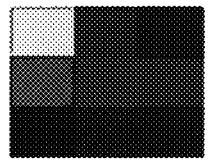 |
FIGURE 4 Type B images based on the card issuer's data items.

| Data Type | Sample Date Value | Encrypted Image | Decrypted Image |
|---|---|---|---|
| Card Holder | 'Mona Lisa' | 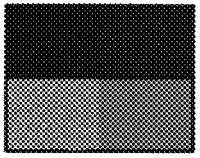 | 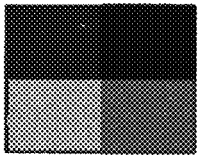 |
| Card Holder's Address | 'The Louvre, Paris, France' | 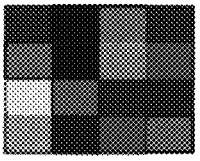 | 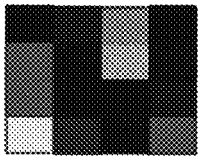 |
| Date of Birth | 'August 1, 1850' | 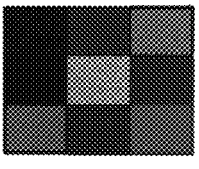 | 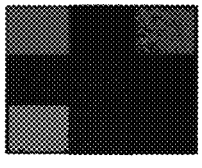 |
FIGURE 5 Type B images based on the card holder's data items.

| Card Type | Composite Image | Encrypted Composite Image | Decrypted Composite Image | Difference between composite and decrypted composite image |
|---|---|---|---|---|
| Credit Card | | | | |
| Debit Card | | | | |
| Employee ID Card | | | | |
| Driver's License | | | | |

FIGURE 6 Type C images based on concatenated data for all card types

| Employer's Name<br>Employee ID #<br>Card Expiration Date<br>Employee's Name<br>Employee Photo | Credit Card Issuer's Name<br>Credit Card Number<br>Card Expiration Date<br>Security Code<br>Card Holder's Name<br>Card Holder's Photo<br>(optional) | Debit Card Issuer's Name<br>Debit Card Number<br>Card Holder's Name | Licensing Agency Name<br>Driver's Photo<br>Driver's Name<br>Driver's Address<br>License Number<br>Expiration Date<br>Date of Birth |
|---|---|---|---|
| (a) | (b) | (c) | (d) |

FIGURE 7 Typical card information – a) Employee ID card, b) Credit card, c) Debit card, and d) Driver's license

FIGURE 8 Standard card examples using sample data— a) Employee ID card, b) Credit card, c) Debit card and d) Driver's license
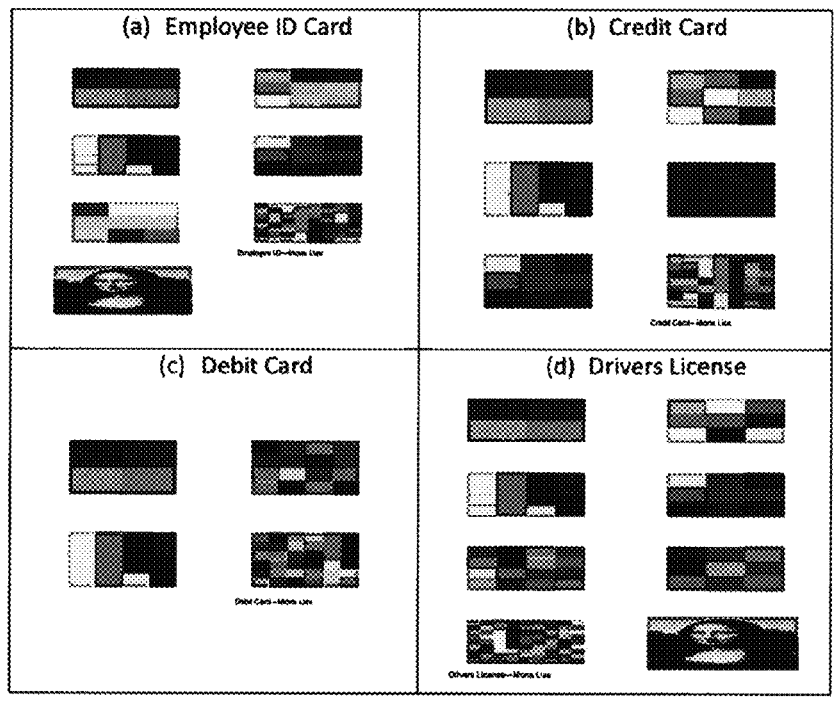
FIGURE 9 IAMNOTANUMBER© Card system sample cards -
a) Employee ID card, b) Credit card, c) Debit card and d) Driver's license

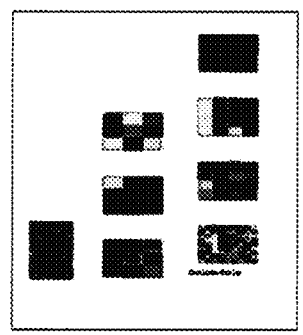
FIGURE 10 IAMNOTANUMBER© Card system artefact for Driver's license with encrypted photograph

IAMNOTANUMBER© CARD SYSTEM: AN IMAGE-BASED TECHNIQUE FOR THE CREATION AND DEPLOYMENT OF NUMBERLESS CARD SYSTEMS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

Does not apply

REFERENCE TO TABLE OR COMPUTER PROGRAM LISTING

The specification is accompanied by one TEXT file containing a computer program listing.

BACKGROUND OF THE INVENTION

This invention is in the field of card systems used for obtaining access to a wide variety of services either in a physical setting or in an online computer network setting. This field is concerned with the diverse techniques that are used in facilitating the secure communication of confidential or proprietary information (messages) between two or more entities. For purposes of this patent application, we restrict our attention to six types of cards—credit cards, debit cards, employee identification (ID) cards, drivers licenses, health insurance cards and social security cards. Under current technological practices, all these types of cards contain identifying information—usually alphanumeric strings specifying name of issuing entity, name of the party to whom the card has been issued, a specific number associated with the card, and period of validity, security code and signature of the card holder.

In the United States, physical or online transactions involving a credit card do not require the user to enter a password whereas transactions involving debit cards do require a password. Also, when credit card transactions are conducted, there is normally no attempt made to verify the identity of the individual using the credit card. This poses a problem since credit cards are often stolen. On the other hand, even if the cards themselves are not stolen but lists of credit card numbers held by various organizations such as banks, credit reporting agencies, large retailers and card processing companies are stolen, a significant number of fake credit cards can be easily manufactured very quickly and used effectively before the theft is noticed.

In the case of employee ID cards, it is extremely simple to make fake ID cards in order to gain access to buildings and computing facilities. In some special political or social situations, even if fake ID cards are not the issue, some employers may not wish to have either their identity or their employees' identities revealed for fear of having their assets compromised or their employees harmed or taken hostage for ransom purposes as, for example, diplomats. In the case of stolen health insurance cards and social security cards, thieves can establish bogus identities and submit fraudulent claims for medical and financial benefits.

The ability of crooks or malefactors to use stolen cards for nefarious purposes is made quite easy because the stolen cards contain names and numbers which are easily read and reproduced. One way to prevent this from happening is to create cards which contain no identifying names or numbers but instead contain other types of information such as images. Transaction processing systems employing images that are currently in existence such as CAPTCHA [See U.S. Pat. No. 6,195,698 B1 "Method for selectively restricting access to computer systems"], have two drawbacks—i) they use images as the second step in a two-step verification process and ii) the images themselves are totally independent of user information such names, card numbers and the like. Two recent patents that heavily rely on images for user identification are the OMNIGENE system [See U.S. Pat. No. 8,787,626 "The OMNIGENE Software System"] and the VIVID system [See U.S. Pat. No. 9,218,528 "VIVID: Image-based technique for validation/verification of ID strings]; however, these systems do not involve the use of imprinted cards nor do they require any password-based encryption/decryption techniques. The KAFKA system, a utility patent application submitted by the inventor to USPTO which is currently under review is also of some relevance to this patent application.

BRIEF SUMMARY OF THE INVENTION

IAMNOTANUMBER© is an image-based technique for the creation and deployment of numberless card systems in a variety of settings including credit card and debit card transactions, restricted access to buildings and computing facilities. Instead of the standard name and number imprinted card systems that are in existence today, the invention described in this application enables the creation of cards which are imprinted with two-dimensional color images. The images seen on the card are actually encryptions of images that have been created from the information provided by two parties—the card issuing organization and the individual to whom the card has been issued. This information which is in the form of alphanumeric strings is first converted into equivalent image representations by the card issuer. In the case of photo identification cards, the photograph of card holder can also be converted if need be. Every card has a password associated with it and this password is provided by the person to whom the card has been issued. It is assumed that whenever the correct password is provided, the card user is an authorized individual. When the correct password is provided, the images imprinted on the card are sent to the card issuing organization to be decrypted and compared against a database of stored images for verification and validation purposes before any transaction is authorized or declined.

BRIEF DESCRIPTION OF THE SEVERAL VIEWS OF THE DRAWING

"The patent or application contains at least one drawing executed in color. Copies of this patent or patent application publication with color drawing(s) will be provided by the Office upon request and payment of the necessary fee"

The inventor petitions the US Patent Office to permit the usage of color drawings in this patent application since they are absolutely essential to the utility of the invention. Visual discrimination of the differences in software system's output for two or more marginally different inputs is rendered possible only through the employment of various shadings and mixtures of red, blue and green colors; such immediate visual discrimination would not be possible using simple black/white or gray scale images.

The IAMNOTANUMBER© card system block schematic is shown in FIG. 1. The system generates three types of images—a) Type A: one set of 'original' images which are created based on information submitted by the card applicant as well as data provided by the card issuing organization, and b) Type 2: here there are two sets of images—one set is comprised of encrypted images generated from. Type A images while the second set is comprised of decrypted images obtained from the encrypted images in the first set, and c) Type C: four sets of composite images—i) set of unencrypted composite images, ii) set of encrypted composite images, iii) set of decrypted composite images, and iv) set of difference images.

Type A Images: These images are shown in FIGS. 2 and 3. Five color images, one for each user provided input data item. These images are stored in a database by the card issuing organization. There are five data items that the user provides to the software system—name, address, date of birth, social security number, and telephone number.

Type B Images: These images are shown in FIGS. 4 and 5. One encrypted image and one decrypted image per card issuer data item. These data items are name, address, and contact telephone or routing number of the card issuing organization, card number assigned to the card applicant, expiration date of the card, and security code associated with the card.

Type C Images: These images are shown in FIG. 6. The four types of images are created based on the string obtained by concatenating certain data items supplied by the card applicant and the card issuer. As to which data items are used in the concatenation operation is solely dependent on the type of card that is to be issued. The four images are the composite image, the encrypted version of the composite image, the decrypted version of the encrypted composite image, and the image representing the difference between the composite image and the decrypted version of the composite image.

FIG. 7 shows the different categories of information that normally appear on cards for four different types of cards—employee ID card, credit card, debit card and driver's license. FIG. 8 shows the same four card types using sample data for the different information categories. FIG. 9 shows the same four card types using the same sample data as in FIG. 8 but as produced by the IAMNOTANUMBER© card system.

For an employee ID card (see FIG. 9a) five encrypted images are imprinted—one image for the employer's name, one image for the employee's name, one image for the card number, one image for the card's validity date, and one image representing the alphanumeric string obtained by concatenating the strings associated with the four data items—employer name, employee name, card number, and card validity date. The employee's name as an alphabetic string and employee's photograph are shown along with the string 'Employee ID'

For a credit card (see FIG. 9b) seven encrypted images are imprinted—one image for the card issuer's name, one image for the card holder's name, one image for the card number, one image for the card's expiration date, one image for the security code of the card, and one image representing the alphanumeric string obtained by concatenating the strings associated with the six data items—card issuer's name, card holder's name, credit card number, card expiration date and the security code assigned to the credit card. Two alphanumeric strings are shown as well—the name of the card holder and the string 'Debit Card'.

For a debit card (see FIG. 9c) four encrypted images are imprinted—one image for the card issuer's name, one image for the card holder's name, one image representing the card number, and one image representing the alphanumeric string obtained by concatenating the four strings associated with the name of the card issuer, name of the card holder, and the card number. Two alphanumeric strings are shown as well—the name of the card holder and the string 'Credit Card'.

For a driver's license (see FIG. 9d) seven encrypted images are imprinted—one image for the name of the agency issuing the driver's license, one image for the person to whom the license issued, one image for the birthdate, one image for the license number, one image for the license's expiration date, one image for the address of the license holder, and one image representing the alphanumeric string obtained by concatenating the strings associated with the six data items—issuing agency's name, license holder's name and address, date of birth, license number, and license expiration date. A photograph of the card holder and two alphanumeric strings are shown as well—the name of the card holder and the string 'Driver License'. The date of birth can be added, if so desired. In situations where even the card holder's photograph needs to be kept hidden, a scrambled version of the photograph based on the card holder's password can be imprinted on the card. An example of this is shown in FIG. 9e for the driver's license.

LIST OF DRAWINGS

FIG. 1 Block schematic of the IAMNOTANUMBER© Card system

FIG. 2 Type A images based on the card issuer's data items.

FIG. 3 Type A images based on the card holder's data items.

FIG. 4 Type B images based on the card issuer's data items.

FIG. 5 Type B images based on the card holder's data items.

FIG. 6 Type C images based on concatenated data for all card types

FIG. 7 Typical card information—a) Employee ID card, b) Credit card, c) Debit card, and d) Driver's license FIG. 8 Standard card examples using sample data—a) Employee ID card, b) Credit card, c) Debit card and d) Driver's license FIG. 9 Examples of cards produced by the IAMNOTANUMBER© Card system—a) Employee ID card, b) Credit card, c) Debit card, d) Driver's license with photograph.

FIG. 10 IAMNOTANUMBER© Card system artefact for Driver's license with encrypted photograph

DETAILED DESCRIPTION OF THE INVENTION

In this document when we use the term 'alphanumeric string' the informational content of such a string is unrestricted and includes passwords, individuals names, card numbers, social security numbers, telephone numbers, and ordinary text such as street addresses, and date of birth.

The IAMNOTANUMBER© Card system which is executed on a computer processor is comprised of a main module and one function module labeled Generate Image. The main module invokes the function module to create images. The main module is split into five program code segments labeled as Data Collection Segment, Inverse Password Computation Segment, Loop Segment, Composite Data Segment, and Card Artefact Creation Segment.

The Data Collection Segment is split into six sections which are labeled Card Applicant Common Information Section, Card Issuer Common Information Section, Card Information Section, Card Type Information Grouping Section, and Folder/File Information Section. The code in this segment accepts input in the form of alphanumeric strings. There is no formatting requirement for any of the input values. The user can enter 'not available' or 'na' or 'Not Available' or 'NA' as a legitimate value for any of the expected input.

The initial input provided to the system is the type of card that is to be created—debit card, credit card, employee ID card or driver's license.

The Card Applicant Common Information Section is used to collect input for the following items—card applicant's name, address, date of birth, social security number, and card applicant's telephone number.

The Card Issuer Common Information Section is used to collect input for the following items—card issuer's name, address, and card issuer's telephone number.

The Card Information Section is used to collect input for the following items—card number to be issued to the applicant, card expiration date (if any) and security code (if any) associated with the type of card to be created.

The Card Type Information Grouping Section is used to group the various data items that define a specific card type. For a debit card the card holder's name, card issuer's name and card number are required. For a credit card, the card holder's name, the card issuer's name, card number, card expiration date, and card issuer's telephone number constitute the group. For the employee id card the following items are needed to define the group: card holder's name, card issuer's name, card issuer's address, and card expiration date. In the case of driver's licenses the following items define the group—card holder, card holder's address, card issuer, card number, expiration date, card holder's address, and date of birth The Folder/File Information Section specifies the names of the folder and the files where all the data are stored. The data includes the user input as well as the images which are created by the system.

The code in the Inverse Password Computation Segment is used to obtain the password, determine its length and then find the inverse password using modular arithmetic. There is no restriction on the length of the password or types of characters comprising the password. First, the inverse character of each of the 128 characters in the ASCII character set is computed by taking the inverse of the numeric equivalent of the character modulo the prime number 257 and stored in a table. Next, for each character in the password, the table is searched to locate the inverse of the numeric equivalent of the password character. These inverse-characters are then concatenated to create the inverse password.

The Loop Segment consists of three sections—the Original Image Creation Section, the Image Encryption Section, and the Image Decryption Section. The code in the Loop Segment is executed once for each alphanumeric string specified in the Data Collection Segment.

In the Original Image Creation Section, the Generate Image function is called with an alphanumeric string as input argument to create a two-dimensional matrix of numeric values. Each element in this matrix represents a pixel and the matrix element's value is taken to be the color value of the pixel. This matrix of color values represents the original unencrypted image of the underlying alphanumeric string. The unencrypted image is displayed and stored as a file in a folder.

The Image Encryption Section is used for encrypting the unencrypted image. The unencrypted image is multiplied modulo 257 by the numeric equivalent of each character in the password in succession. The image that results is the encrypted version of the original unencrypted image which is then displayed and stored in a file.

The Image Decryption Section is used for decrypting the encrypted image. The encrypted image is multiplied modulo 257 by the numeric equivalent of each inverse character in the password in reverse order in succession. The image that results is the decrypted version of the encrypted image which is then displayed and stored in a file.

The Composite Data Segment consists of five sections—the Card Type Specification Section, the Composite Image Generation Section, the Composite Image Encryption Section, the Composite Image Decryption Section, and the Difference Image Section.

In the Card Type Specification Section, based on the type of card that needs to be created—debit, credit, employee id or driver's license—the alphanumeric strings which are required to produce the images that are to appear on the card are grouped.

The code in the Composite Image Generation Section is used to first concatenate the alphanumeric strings which have been grouped in the Card Type Specification Section. The Generate Image function is then invoked using this concatenated alphanumeric string as argument to produce a two-dimensional numeric matrix where each element in the matrix represents a pixel and the matrix element's value is taken to be the color value of the pixel. This matrix of color values represents the original unencrypted composite image of the underlying concatenated alphanumeric string. The unencrypted composite image is displayed and stored as a file in a folder.

The Composite Image Encryption Section is used for encrypting the unencrypted composite image. The unencrypted composite image is multiplied modulo 257 by the numeric equivalent of each character in the password in succession. The composite image that results is the encrypted version of the original unencrypted composite image which is then displayed and stored in a file.

The Composite Image Decryption Section is used for decrypting the encrypted composite image. The encrypted image composite is multiplied modulo 257 by the numeric equivalent of each inverse character in the password in reverse order in succession. The image that results is the decrypted version of the encrypted composite image which is then displayed and stored in a file.

The code in the Difference Image Section is for producing the difference image which is defined as the image matrix that results from subtracting the decrypted composite image matrix from the composite image matrix, pixel by pixel. The difference image matrix is displayed and stored in a file.

The Card Artefact Creation Segment contains code to produce any one of the four different types of cards—debit card, credit card, employee ID card, and driver's license. The same code can be used to produce social security cards and health insurance cards as well. For the card types that typically contain a photograph of the card holder, the code allows a user to incorporate a photograph into the card. The photograph is encrypted using the cardholder's password and imprinted on the card. Even though the card that is created typically contains only two alphanumeric string— name of card holder and type of card—in the case of driver's licenses the data of birth as an alphanumeric string can also be shown in order to deal with situations where age restrictions apply as, for example, in the purchasing of cigarettes or liquor or entry into establishments where liquor consumption is allowed.

Generate Image (alphanumeric string): This function takes the input argument which is a linear alphanumeric string and converts it into a two dimensional square matrix. If the length of the string is not an exact square value, enough pad characters (the pad character '$' is used in this application) are appended to the string so that the revised string's length is an exact square. The size of the square matrix is determined by computing the square root of the length adjusted alphanumeric string. The alphanumeric characters in the matrix are then converted into real values. The matrix elements are treated as pixels whose color contents are determined by the matrix element values.

The complete IAMNOTANUMBER© Card System protocol is as follows:

Procedure A (for creating a numberless card by the card issuing organization):
1. User submits personal information (name, address, date of birth, social security number, and telephone number) in the form of alphanumeric strings to the organization issuing the card.
2. User submits an initial password (also an alphanumeric string) and, if required, a photograph to the card issuing organization.
3. Card issuing organization creates unencrypted images based on the user's personal data and photograph (if any), one image per data item and stores these images in a database along with the associated alphanumeric strings.
4. Card issuing organization creates encrypted images based on the user's personal data and photograph (if any), one image per data item, using the password submitted by the user and stores these images in the database.
5. Card issuing organization creates unencrypted images based on the organization's own information (organization name, contact telephone, card number, card expiration date and associated security code), one image per data item, and stores these images in a database along with the associated alphanumeric strings.
6. Card issuing organization creates encrypted images based on the organization's own information using the user-supplied password and stores these images in the database.
7. Card issuing organization sends a card with the requisite number of encrypted images but no numbers to the user.

Procedure B (for creating an image from an alphanumeric string and storing it):
1. Obtain the length of the alphanumeric string.
2. If the length of the alphanumeric string is not an exact square, append the alphanumeric string with sufficient pad characters so that the length of the padded alphanumeric string represents and exact square number.
3. Reshape the alphanumeric string into a square two-dimensional structure.
4. Use the numerical value of each alphanumeric character in the two-dimensional structure to create a color pixel.
5. The two-dimensional set of color pixels created in step 4 represents the image version of the alphanumeric string.
6. Store the image in a database or library along with the alphanumeric string that was used in creating the image.

Procedure C (for encrypting an image and optionally storing it):
1. Convert each character in the user-supplied password into its numeric equivalent.
2. Multiply the image by the numeric equivalent of each character in the password modulo a prime number in sequential fashion.
3. After all the characters in the password have been processed, the resulting final image represents the encrypted image of the original image created in procedure B.
4. [Optional] Store the encrypted image in the database or library indexed by the alphanumeric string that was used in creating the original image.

Procedure D (for decrypting an image):
1. Obtain the numerical equivalent of the inverse of each character in the password modulo a prime number.
2. Multiply the encrypted image by the numeric equivalent of each inverse character in the password modulo a prime number in reverse sequential fashion.
3. After all the inverse characters in the password have been processed, the resulting final image represents the decrypted image of the encrypted image created by procedure C.

Procedure E (for using the numberless card at the point-of-transaction terminal):
1. User swipes the card at the point-of-transaction terminal the card and enters the password on the keypad.
2. The encrypted images on the card and the password are transmitted to the card issuing organization.
3. The card issuer transmits an 'Accepted/Declined' message to the point-of-transaction terminal.

Procedure F (followed at the card issuing organization for accepting or declining a card):
1. Decrypt the images sent from the point-of-transaction terminal using the password as the key.
2. Compare the decrypted images against the original images stored in the database.
3. Transmit 'Accept' to the point-of-transaction terminal if there is an exact match between the decrypted images and the stored images otherwise transmit 'Decline'.
4. [Optional] Transmit the alphanumeric strings associated with the stored images to the merchant where the point-of-transaction terminal is located, if requested by the merchant.

The invention claimed is:
1. A method for creating and deploying a card system using at least one of a plurality of computer hardware processors, the method comprising:
creating two-dimensional color images and no numbers on a card, wherein each image on the card is based on an alphanumeric string or a photograph, wherein the alphanumeric string or the photograph represents a specific piece of information provided by a card issuing organization or a card user;
wherein the each image on the card is an encrypted image generated on the basis of a password supplied by the card user to the card issuing organization, wherein the card issuing organization stores in a database or library the alphanumeric string representing a user-supplied data item with original images which the card issuing organization generates from the user-supplied data item and an encrypted version of the original images;

transmitting the encrypted images on the card to the card issuing organization for validation and verification in response to the card user attempts to use the card with the password to initiate a transaction;

decrypting the encrypted images, by the card issuing organization in response to receiving the encrypted images, wherein the card issuing organization inverts the password in order to decrypt the encrypted images;

comparing, by the card issuing organization, the decrypted images with the original images in the database or library; and sending, by the card issuing organization, information for approval or declension of the transaction to a site where the transaction originated.

2. The method according to claim 1, wherein the alphanumeric string or photograph is reshaped into a square matrix representation using pad characters and a numerical equivalent of the square character matrix defines a set of pixels which are used in obtaining the each image.

3. The method according to claim 2, wherein the each image obtained is encrypted using the password provided by the user.

4. The method according to claim 1, wherein the alphanumeric string representing the password is inverted.

5. The method according to claim 4, wherein the encrypted image is decrypted using the inverted password.

6. The method according to claim 1, wherein the alphanumeric strings provided by the card user to the card issuing organization represent the card user's name, address, date of birth, telephone number, and social security number.

7. The method according to claim 1, wherein the alphanumeric strings provided by the card issuing organization represent a name, address and telephone or routing number of the organization, card number, card expiration date and security code.

8. The method according to claim 1, wherein the card is a credit card.

9. The method according to claim 1, wherein the card is a debit card.

10. The method according to claim 1, wherein the card is an organization's identification (ID) card.

11. The method according to claim 1, wherein the card is a driver's license.

12. The method according to claim 1, wherein the card is a health insurance card.

13. The method according to claim 1, wherein the card is a social security card.

14. The method according to claim 1, wherein the information sent by the card issuing organization is any alphanumeric string representing user information.

15. The method according to claim 1, wherein the information sent by the card issuing organization is an alphanumeric string representing the organization's information.

16. The method according to claim 1, wherein where the information sent by the card issuing organization is any image representing user information.

17. The method according to claim 16, wherein the any image representing user information is encrypted or unencrypted.

18. The method according to claim 1, wherein the information sent by the card issuing organization is any image representing the organization's information.

19. The method according to claim 18, wherein the any image representing the organization's information is encrypted or unencrypted.

* * * * *